United States Patent [19]
Serruys

[11] 3,866,579
[45] Feb. 18, 1975

[54] ANTI-POLLUTION DEVICES FOR INTERNAL COMBUSTION ENGINES

[76] Inventor: Max Serruys, 102 Rue du Bac, Paris, France

[22] Filed: June 30, 1972

[21] Appl. No.: 268,150

[30] Foreign Application Priority Data
July 16, 1971  France .............................. 71.26080

[52] U.S. Cl. .............. 123/25 A, 123/127, 123/25 R
[51] Int. Cl. ........................................... F02m 25/02
[58] Field of Search.. 123/25 R, 25 A, 25 N, 119 D, 123/119 PB, 119 E, 124 R, 127; 60/276, 282, 292

[56] References Cited
UNITED STATES PATENTS

| | | | |
|---|---|---|---|
| 1,761,692 | 6/1930 | Stepp | 123/119 DB |
| 2,052,608 | 9/1936 | DelValle | 123/25 A |
| 2,603,557 | 7/1952 | Roush | 123/127 |
| 2,606,537 | 8/1952 | Baumheckel | 123/127 |
| 2,922,408 | 1/1960 | Humphries et al. | 123/25 N |
| 3,154,060 | 10/1964 | Hundere | 60/276 |
| 3,190,275 | 6/1965 | Serruys | 123/124 R |
| 3,486,326 | 12/1969 | Hermes et al. | 60/282 |
| 3,537,829 | 11/1970 | Ott | 123/119 E |
| 3,626,915 | 12/1971 | Nakajima | 123/119 D |
| 3,641,767 | 2/1972 | Kraus et al. | 123/119 D |
| 3,707,954 | 1/1973 | Nakada et al. | 123/124 R |

FOREIGN PATENTS OR APPLICATIONS

| | | | |
|---|---|---|---|
| 1,576,454 | 10/1969 | Germany | 123/119 D |

Primary Examiner—Charles J. Myhre
Assistant Examiner—R. H. Lazarus
Attorney, Agent, or Firm—Young & Thompson

[57] ABSTRACT

An anti-pollution device for an internal combustion engine, in which an excess of combustion air is used, comprises means adapted to spray an aqueous liquid into the fuel-air mixture of the engine, with a flow which is greater when the load is high than when the load is low, so as to act at high loads to reduce the content of nitrogen oxides.

The aqueous liquid may be sprayed into the fuel inlet track upstream of the throttle, or into a carburettor, or into an additional air supply duct, or into the combustion chamber itself. Preferably load sensitive means are arranged to control the flow of aqueous liquid in such a manner that this flow is at its maximum when the load is high, medium when the load is medium, and zero when the load is low.

2 Claims, 4 Drawing Figures

3,866,579

ANTI-POLLUTION DEVICES FOR INTERNAL COMBUSTION ENGINES

BACKGROUND OF THE INVENTION

1. Field of the Invention

The invention relates to anti-pollution devices for internal combustion engines.

2. Description of the Prior Art

Anti-pollution devices have already been proposed in which the carbon monoxide and hydrocarbons contained in the burnt gases are reduced to very low values by adjusting the fuel/air ratio, with a tendency to restrict any excess of fuel to a very low level and even, for preference, to maintain an excess of oxygen sufficient to oxidise the harmful components.

Nevertheless, because of Le Chatellier's law, any excess of oxygen tends to promote the formation of oxidising products, such as nitrogen oxides. This is particularly so with excess of combustion air of the order of 1 to 3 percent.

Paradoxically these anti-pollution devices therefore assist the formation of such nitrogen oxides, which — directly or indirectly — are no less dangerous than carbon monoxide and hydrocarbons and must be avoided for the same reasons.

SUMMARY

The Applicant has discovered that, in the presence of an excess of combustion air sufficiently large to ensure very low carbon monoxide and hydrocarbon contents, it is possible to contemplate lowering the temperature of combustion sufficiently to ensure that the equilibrium constant of the law of mass action is modified to such an extent tht the nitrogen oxide content can be considerably reduced. It will be appreciated that the fall in temperature also brings about a reduction of the speeds of reaction acting in the desired favourable direction.

The present invention has as object improvements in anti-pollution devices for internal combustion engines in which an excess of combustion air is provided, preferably to devices of the type acting by adjusting the fuel/ combustion air ratio, more particularly by adjusting the excess of combustion air, these improvements consisting in lowering the maximum temperature attained in the burnt gases immediately after their combustion or during the additional compression which they undergo after combustion, while increasing the calorific capacity of the mixture containing a given mass of fuel.

These improvements forming the object of the invention consist more particularly in spraying water or an aqueous mixture upstream of or inside the combustion chambers, and they are characterised in that load sensitive means are provided for governing the flow of water or aqueous mixture injected, in such a manner that this flow is considerable when the load is high and is reduced or zero when the load is low. Load, or more precisely percentage of full load at a given moment, is the term used to indicate the ratio fo the torque actually developed at that moment, for a given rotational speed of the engine, to the maximum torque corresponding to the same speed of rotation of the engine.

It is known that load depends on the suction (or degree of vacuum) obtained in the induction pipe downstream of the throttle; it is in fact known that at zero load, that is to say during idling, suction is at its maximum while at full load suction is at its minimum.

The means which according to the invention enable the flow of water or of aqueous mixture injected to be modified in dependence on load can in these circumstances be controlled by the suction in the induction pipe, for example by using a pressure capsule or other suitable means; according to the invention they may, however, also be controlled by a parameter dependent on the flow of gas drawn in by the engine, for example by the suction produced by the passage of this gas flow through a nozzle or orifice of constant section.

In one embodiment the water or aqueous mixture is injected and atomised into the air admitted to the carburettor. As an alternative, the water or aqueous mixture is atomised in parallel with the petrol feeding the carburettor jet. In another alternative the water or aqueous mixture is atomised into an additional supply of air, for example of the type described in French Pat. No. 1,339,623 of August 27, 1962 in the name of the applicant for "Arrangement of gas circulation in internal combustion engines for eliminating harmful elements from the combustion gases" or its First Certificate of Addition No. 83,177 Jan. 29, 1963, or in French Pat. No. 1,552,156, likewise in the name of the applicant, of Nov. 21, 1967, for "Device for feeding carburetted gas to internal combustion engines."

This additional supply of air is intended to regulate the excess of combustion air in order to oxidise the carbon monoxide and hydrocarbons, while the addition of a mist of water of aqueous mixture enables the formation of nitrogen oxides to be avoided or to be considerably reduced.

The additional supply of air is preferably so regulated that at medium or low loads the excess of combustion air is brought to a sufficiently high value for the oxygen of the dry burnt gases to be of the order of 4 to 8 percent, which, if certain precautions are taken, is a value compatible not only with load and with regular operation of the engine but also with the obtaining of sufficiently low contents of hydrocarbons, while at high loads (for which a heavy excess of combustion air cannot be accepted) the formation of nitrogen oxides is avoided by injecting a high proportion of atomised water into the fuel mixture.

In another variant it is also possible to provide for direct injection of water or aqueous mixture into the combustion chamber, preferably into the region of the combustion chamber where the gases burn first and consequently undergo the greatest compression after combustion and before expansion.

It has of course already been proposed to inject water or water vapour into internal combustion engines, but as a rule this was under the control of the driver, in small amounts, and with the object of obtaining a momentary increase of engine response or in order to avoid detonating combustion or "knocking."

The invention is distinguished from these means by the fact that the addition of the mist of water or of aqueous mixture is systematic and is effected on the one hand in conjunction with an excess of combustion air and on the other with a flow which is zero up to a predetermined load threshold and which then increases with the load until it equals or even exceeds the flow of fuel, this being done with the entirely determined and novel aim of simultaneously eliminating all the various harmful products from the exhaust, namely carbon monoxide, hydrocarbons, and nitrogen oxides, with optimum efficiency of the water consumed.

It will be appreciated that the higher the load, the more useful this eliminatiaon will be and it is precisely this that the invention permits. It will be noted that the additional water supply is automatically stopped at low loads, that is to say at the moment when the injection of water or of aqueous mixture is no longer very useful in the battle against pollution and that on the contrary there is a risk that it might be harmful by producing secondary effects, such as condensation, etc.

DESCRIPTION OF THE PREFERRED EMBODIMENTS

Figure 1:
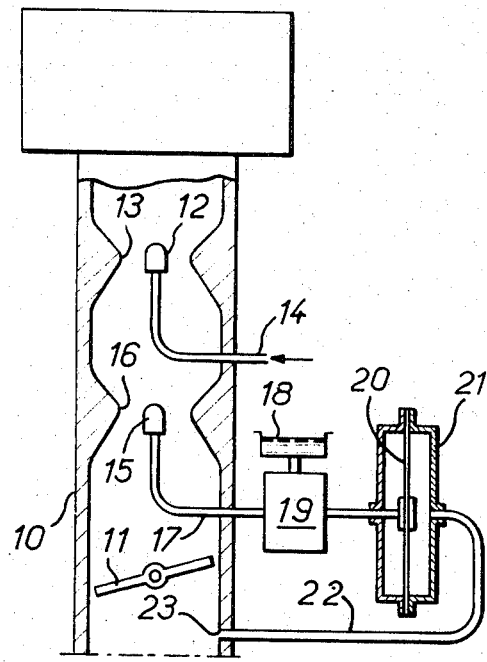
FIG. 1 is a diagrammatical view of an induction pipe in which provision is made for water or aqueous mixture to be sprayed into the carburettor, in accordance with the invention.

Reference will first be made to FIG. 1, in which 10 designates the induction pipe of an internal combustion engine, 11 the throttle valve of the carburettor, 12 the petrol jet which is disposed level with the venturi neck 13 in the pipe 10 and which is connected to a fuel supply pipe. The carburettor is so adjusted as to obtain a substantial excess of combustion air, except possibly at full load or during idling.

According to the invention, provision is made for water or aqueous mixture to be introduced at 15 into the induction pipe 10 upstream of the throttle 11 and preferably downstream of the petrol jet.

An aqueous mixture is preferably used rather than water, so as to obtain a liquid the surface tension of which is substantially reduced, the freezing temperature of which is also reduced, and the rusting power of which is likewise reduced. For this purpose water is added to organic compounds such as higher alcohols, ethyl alcohol, methanol, soluble ethers, various soaps, ammonia, etc.

In the example illustrated in FIG. 1 this addition of water is effected through a jet 15 which is disposed level with a venturi neck 16 in the pipe 10 and which is connected to a water or aqueous mixture supply pipe 17. The jet 15 is similarly constructed to the jet 12, being for example of the pre-emulsion type.

The pipe 17 is connected to a source, such as a constant level reservoir 18, by way of a valve 19, the opening of which is variable and is opened to a greater extent the higher the load, so that this valve is wide open at high loads, half-open at medium loads, and completely closed at low or zero loads.

For this purpose the obturator element of the valve 19 can be controlled by the diaphragm 20 of a pressure capsule 21, which is connected by a pipe 22 to the induction pipe 10 at 23 downstream of the throttle 11.

In the region 23 the suction or degreee of vacuum in the pipe 10 varies in dependence on load: suction is at its maximum at zero load and at its minimum at full load. This being the case, the diaphragm 20 adjusting the valve 19 is controlled by the suction and consequently by the load.

Still more simply, the constant level reservoir 18 may advantageously be disposed a determined height below the jet 15, whereby a suction threshold, and consequently a threshold of power, is produced below which the flow of water induced is zero while beyond this threshold the flow becomes an increasing function of suction or power. Because of the addition of water the maximum temperature achieved in the burnt gases immediately after their compression, or during the additional compression undergone after combustion, is lowered, and consequently the equilibrium constant of the law of mass action is modified to such an extent that the nitrogen oxide contents are considerably reduced.

In these circumstances, the improvements according to the invention permit a considerable improvement, in a simple manner, of conditions for combatting pollution.

Figure 2:
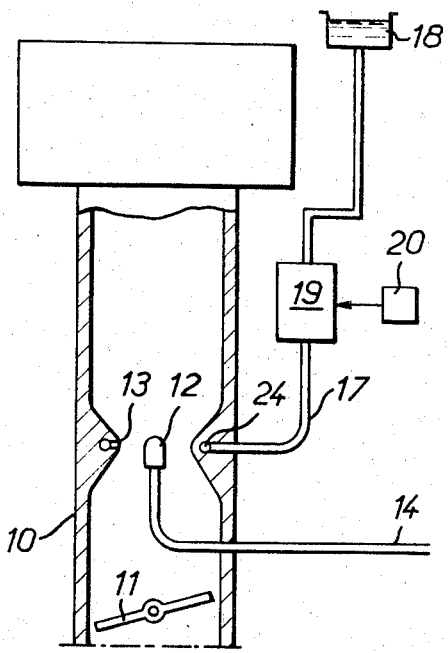
FIG. 2 is a similar view to FIG. 1, but here the spraying of water is effected at the fuel inlet.

Reference will now be made to FIG. 2, where the arrangement is similar to that just described in connection with FIG. 1, but in which the water supply pipe 17 is connected at 24 direct to a circular duct supplying a series of orifices leading into the neck 13. At 19 and 20 the system for adjusting water flow in dependence on load can be seen.

Figure 3:
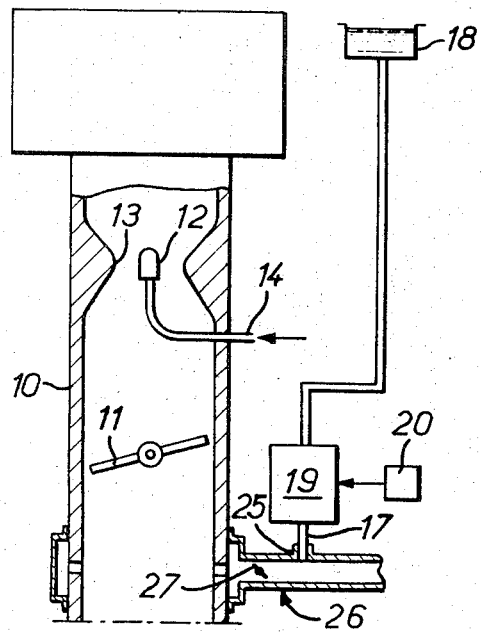
FIG. 3 is once again a view similar to FIG. 1, but here the water or aqueous mixture is added to an additional air supply.

In the alternative illustrated in FIG. 3 the water supply pipe 17 is connected at 25 to an additional air supply system designated 26–27 and disposed downstream of the throttle 11. This additional air supply system is preferably of the type described in the previously mentioned French Patent of the Applicant No. 1,339,623 and Additions No. 83,177 and No. 1,552,156.

This additional air system enables pollution to be combatted by adjustment of the fuel/air ratio, more particularly by adjusting an excess of air.

It is preferable, particularly at medium and low loads, for the excess of air to be brought to a sufficiently high value to ensure that the oxygen content of the dry burnt gases will be of the order of 4 to 8 percent or even more, that is to say the highest value compatible with the load, with regular operation of the engine, and with sufficiently low hydrocarbon contents.

The addition of water or aqueous mixture according to the invention makes it possible for the content of nitrogen oxides to be further reduced at medium loads and to be considerably reduced at high loads (for which only a slight excess of air can be accepted).

In another variant (FIG. 4), water or aqueous mixture is added by means of a mechanical injection device similar to those used conventionally for injecting fuel, injection here being effected directly into the combustion chamber C.

Figure 4:
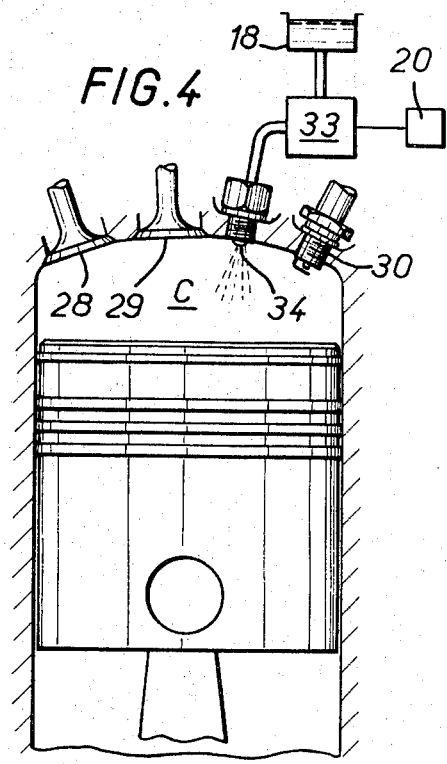
FIG. 4 relates to another alternative in which provision is made for water to be added by mechanical injection direct into the combustion chamber.

In FIG. 4 the admission valve can be seen at 28, the exhaust valve at 29, and the sparking plug at 30.

Starting from the reservoir 18, the water injection device here comprises a mechanical pulsating injection pump 33, the delivery of which is controlled by the pressure capsule 20 and directed towards an injector 34, which atomises this supply of water into the region of the combustion chamber near the sparking plug 30.

It will be appreciated that under these conditions the injector 54 will introduce atomised water into a region of the combustion chamber where the gases are admitted to burn first and where the temperature of the burnt gases attains its highest values at the moment when pressure is at its maximum.

I claim:

1. An anti-pollution device for an engine having combustion chamber means, an induction pipe for feeding fuel-air mixture to said combustion chamber means, a throttle in said induction pipe, and air feeding means for supplying an excess of combustion air in said induction pipe, said device comprising load-sensitive liquid feeding means for spraying an aqueous liquid into the fuel-air mixture of the engine, said load sensitive feeding means comprising a liquid source, said air feeding means comprising a conduit having a throttle therein, means for feeding liquid from said liquid source into said conduit upstream of the last-named throttle and means responsive to engine load to spray said liquid at a liquid flow rate which is at its maximum when the load is high; medium when the load is medium and zero when the load is low.

2. A device as claimed in claim 1, said conduit emptying into said induction pipe downstream of the first-mentioned throttle.

* * * * *